(12) United States Patent
Yoshioka

(10) Patent No.: US 6,330,641 B1
(45) Date of Patent: Dec. 11, 2001

(54) METHOD AND APPARATUS FOR CONTROLLING MAGNETIC DISK DEVICE

(75) Inventor: Sadao Yoshioka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/314,134

(22) Filed: May 19, 1999

(30) Foreign Application Priority Data

May 19, 1998 (JP) .................................................. 10-136885

(51) Int. Cl.$^7$ ...................................................... G06F 12/00
(52) U.S. Cl. ........................... 711/113; 711/111; 711/112; 711/129
(58) Field of Search ............................. 711/111–113, 129

(56) References Cited

U.S. PATENT DOCUMENTS 5,724,542 * 3/1998 Taroda et al. ........................ 395/440
6,134,631 * 10/2000 Jennings, III ........................ 711/117

FOREIGN PATENT DOCUMENTS

| | | |
|---|---|---|
| 2-213962 | 8/1990 | (JP) . |
| 4-111030 | 4/1992 | (JP) . |
| 4-162127 | 6/1992 | (JP) . |
| 4-281350 | 10/1992 | (JP) . |
| 4-290115 | 10/1992 | (JP) . |
| 5-66999 | 3/1993 | (JP) . |
| 6-282384 | 10/1994 | (JP) . |
| 8-30395 | 2/1996 | (JP) . |
| 8-95717 | 4/1996 | (JP) . |

* cited by examiner

*Primary Examiner*—Matthew Kim
*Assistant Examiner*—Pierre M. Vital
(74) *Attorney, Agent, or Firm*—Foley & Lardner

(57) ABSTRACT

Method/System of controlling read/write of a magnetic disk device uses a cache memory having an error area with a block control table. The cache memory has an error block data area in addition to an inherent cache area having a cache control table and a cache data area. The cache memory also has a provision for storing and controlling a block of data which has required retry on reading of the data on the disk. Control is effected which will not lower the operation performance of a magnetic disk device even if there is data, which requires retry operation and an extended period of time is taken to read is stored in the magnetic disk device.

7 Claims, 3 Drawing Sheets

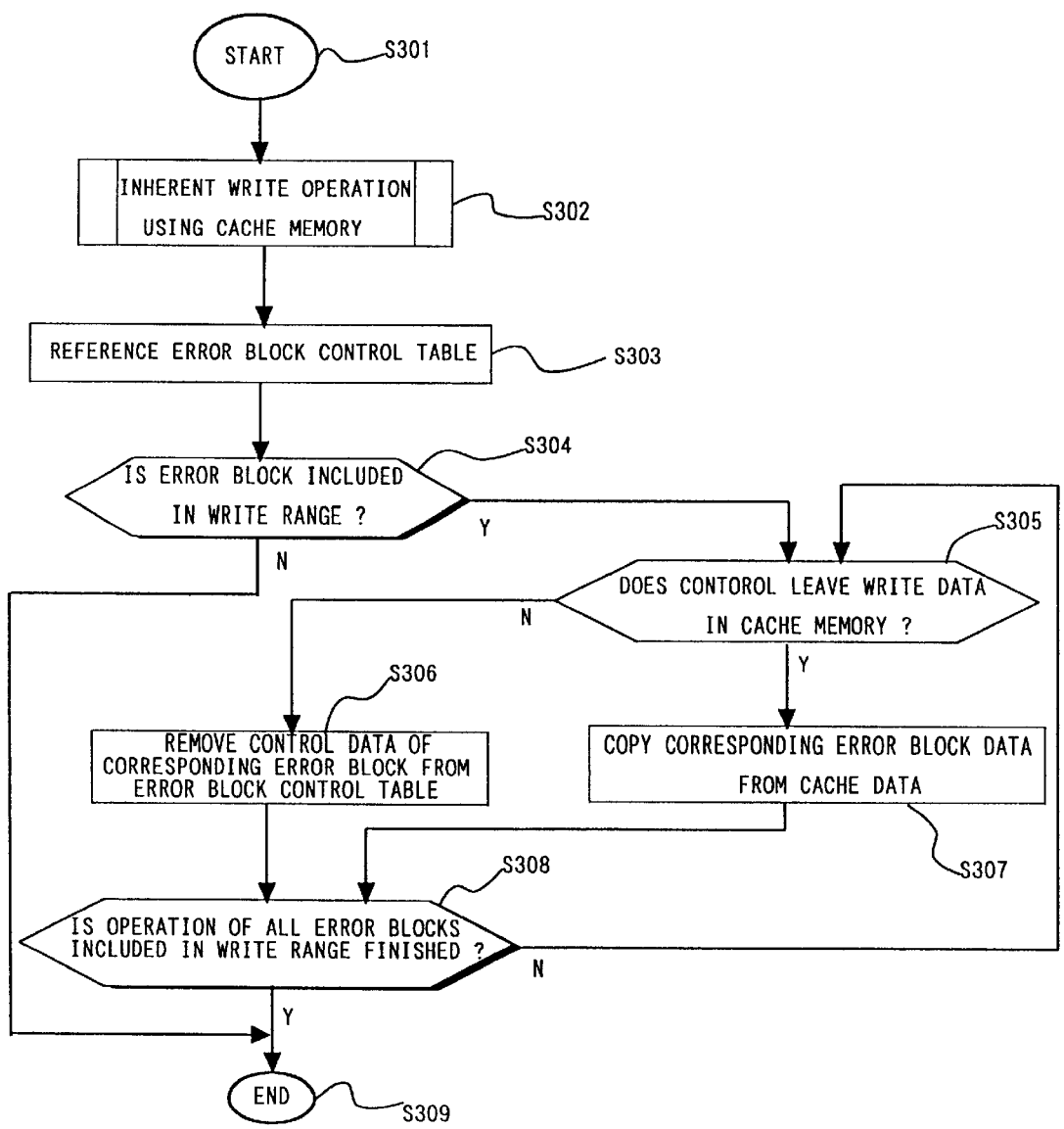

METHOD AND APPARATUS FOR CONTROLLING MAGNETIC DISK DEVICE

FIELD OF THE INVENTION

The present invention relates to a method of controlling a magnetic disk device, which is capable of processing for rapidly writing and reading data on the magnetic disk device.

DESCRIPTION OF THE RELATED ART

For enhancing the processing efficiency of the magnetic disk device, a control unit is provided with a cache memory and data which is frequently accessed is stored therein and transferred from the cache memory upon request for the data without accessing to the magnetic disk device to shorten the period of processing time. It is known that selection of data to be stored in the cache memory and the manner of use of the cache memory give a large influence upon the degree of the enhancement in the processing speed.

As an effective method, a technique to minimize the access to the magnetic disk by dividing an object of the cache memory be managed into sector units is disclosed in Japanese Patent Kokai Publication JP-A-2-213962. Another technology attempting to prevent the lowering of the processing speed caused by deterioration of successive operation for the magnetic disk when data including an alternative area is read, by replacing the data which has been transferred to the alternative area based on a defect on the disk to the cache memory is disclosed in Japanese Patent Kokai Publication JP-A-5-66999.

SUMMARY OF THE DISCLOSURE

Serious problems which are related with the processing speed of the magnetic disk include retry processing for a read error. It may take a long extended period of time to complete the retry processing. The read error which requires the retry processing may occur due to the deterioration of the performance with lapse of time and conditions of application environment. Not all the read errors can be predicted. In the prior art control, the data which has been read for the retry processing is stored in the cache memory. While the data is stored in the cache memory, the data in the cache memory is used so that the efficiency is temporarily enhanced. The data is occasionally removed from the cache memory in the course of time due to using condition of the cache data. When the data which requires the retry processing is requested again, the processing speed is remarkably lowered due to the retry processing. Although processing to eliminate the read error is conducted by transferring data which frequently requests retry processing in the usual disk control, it takes an excessively extended period of time to complete the processing to transfer the data to an alternate area, and special processing is required. Accordingly, a number of devices are not capable of conducting such processing in the usual application environment.

Therefore, it might be conceived a method not to erase data which has been stored on a cache memory once as a result of retry. However, when a plurality of retry data are generated, the data would remain in an irregular manner if the data are left as they are. This would invite deterioration of the use efficiency of the cache memory and complication of the data management. For solving this problem, a new cache control such as rearrangement of control units and resident data would be required.

Therefore, it is an object of the present invention to provide a novel control method and system for shortening the processing period of time of the magnetic disk which is taken to complete the retry processing by making the data requiring the retry processing be resident in an appropriate unit, so that lowering of the processing performance of the magnetic disk device is suppressed.

Further, objects of the present invention will become apparent in the entire disclosure.

In accordance with one aspect of the present invention there is provided a novel method of controlling read/write of a magnetic disk device using a cache memory. The method of controlling the magnetic device is characterized in the following features:

Data of a block, for which has been required retry for reading data on the disk, is stored in an error area in the cache memory which is provided separately from a cache area, and if a block which is stored in the error area is included in a read request of data from a host unit, the block is read.

The method may further comprise the steps of:

on reception of a read request from the host unit, transferring the data to the host unit if the requested data is stored in the cache data area;

if no data is stored in the cache data area, calculating the range of data to be read, and reading from the magnetic disk device the data in the range up to the block concerned if there is registered data in the error block or reading data in the entire calculated range if there is no registered data to transfer the read data to the host unit and to store it in the cache area;

copying the data at a block address for which retry has been required of reading operation from the magnetic disk device to the error block data area if the retry has been conducted;

if data has been registered in the error block after reading from the magnetic disk device, subsequently selecting and transferring corresponding data from the error block data area to the host unit, and incorporating the data into the block concerned of the cache data area; and repeating the steps of reading of data from the magnetic disk device and reading of data from the error block data area until reading of data in the range to be read is completed.

The method may further include the steps of:

writing to the magnetic disk device data which is transferred on reception of a write request from said host unit;

if the entire block address range in which the transferred data is accommodated is stored in the cache area, writing the transferred data to said magnetic disk device and replacing the data in the corresponding cache area by the transferred data;

if the block which has been registered in the error area is included in the write requested range and write data does not remain in the cache area, canceling the registration of a block included in the range from said error area to the write area; and if the block which has been registered is included in the error area in the write requested range and write data remains in the cache area, selecting corresponding data from the data in the cache area and copying the data to corresponding area of the error area.

According to a second aspect of the present invention there is provided a control apparatus of the magnetic disk device, particularly, an apparatus for controlling read/write of a magnetic disk device, including a cache memory. The control apparatus of the magnetic disk device comprises a host unit interface, magnetic disk device interface, cache memory interface, cache memory, control system and recording medium. The host unit interface is adapted to transfer read/write data and to exchange control information between the host unit interface and the host unit. The magnetic disk device interface is adapted to transfer read/write data and to exchange control information between the magnetic disk device interface and the magnetic disk device. The cache memory interface is adapted to transfer read/write data and to exchange control information between the cache memory interface and the cache memory. The cache memory comprises a cache memory area which is used as an inherent disk cache and an error area for holding and controlling data of a block for which retry has been done, each block including a control table and data area. The control system controls the operation of read/write of data from/to the magnetic disk device on reception of an instruction from the host unit in response to an operation command in accordance with a program. The recording medium records thereon a control program for controlling read/write of data from/to said magnetic disk device in the control system.

The data of the magnetic disk device which is treated as cache data may be stored in the cache data area, information used for controlling the use condition of the cache memory may be stored in the cache control table. The data of the block which could be read by retry may be stored in the error block data area, and information used for control the registration condition of the error block may be stored in the error block control table.

In accordance with the present invention, in addition to the inherent cache control table and the cache data area, an error block control table and an area for error block data are provided and means is provided for storing and controlling a block data for which retry has been required on reading of the data on the disk.

In the cache memory control for the magnetic disk device of the present invention, the address of the block, which is reported that it has conducted the retry operation on reading of data from the magnetic disk device is registered in the error block control table and the data of the block is copied to the data area for the error block and is left even if original data is removed from the cache memory. If the data requested when the data is requested from the host unit is not in the cache memory, the data would be read from the magnetic disk device. When the data is to be read from the magnetic disk device, firstly the error block control table is referenced. If the data of the block which is registered in the error block control table is included in the data to be read, data other than the block which has been registered in the error block control table is read from the magnetic disk device. The data of the block which has been registered in the error block control table is read from the data area for the error block and is transferred to the host unit together with the data read from the magnetic disk device and usual cache control is performed.

According to a further aspect of the present invention there is provided a computer readable program product which may be carried on a computer readable medium, whatever it may be either static or dynamic e.g. may be carried by and/or contained in a carrier wave transmitted through a network system. The program is such that gives commands for controlling the operation of the methods and system or device aforementioned.

BRIEF DESCRIPTION OF THE DRAWINGS

FIG. 3 is a flow chart showing the summary of the operation of a control apparatus when it receives a request of writing of data from host unit.

PREFERRED EMBODIMENTS OF THE INVENTION

Figure 1:
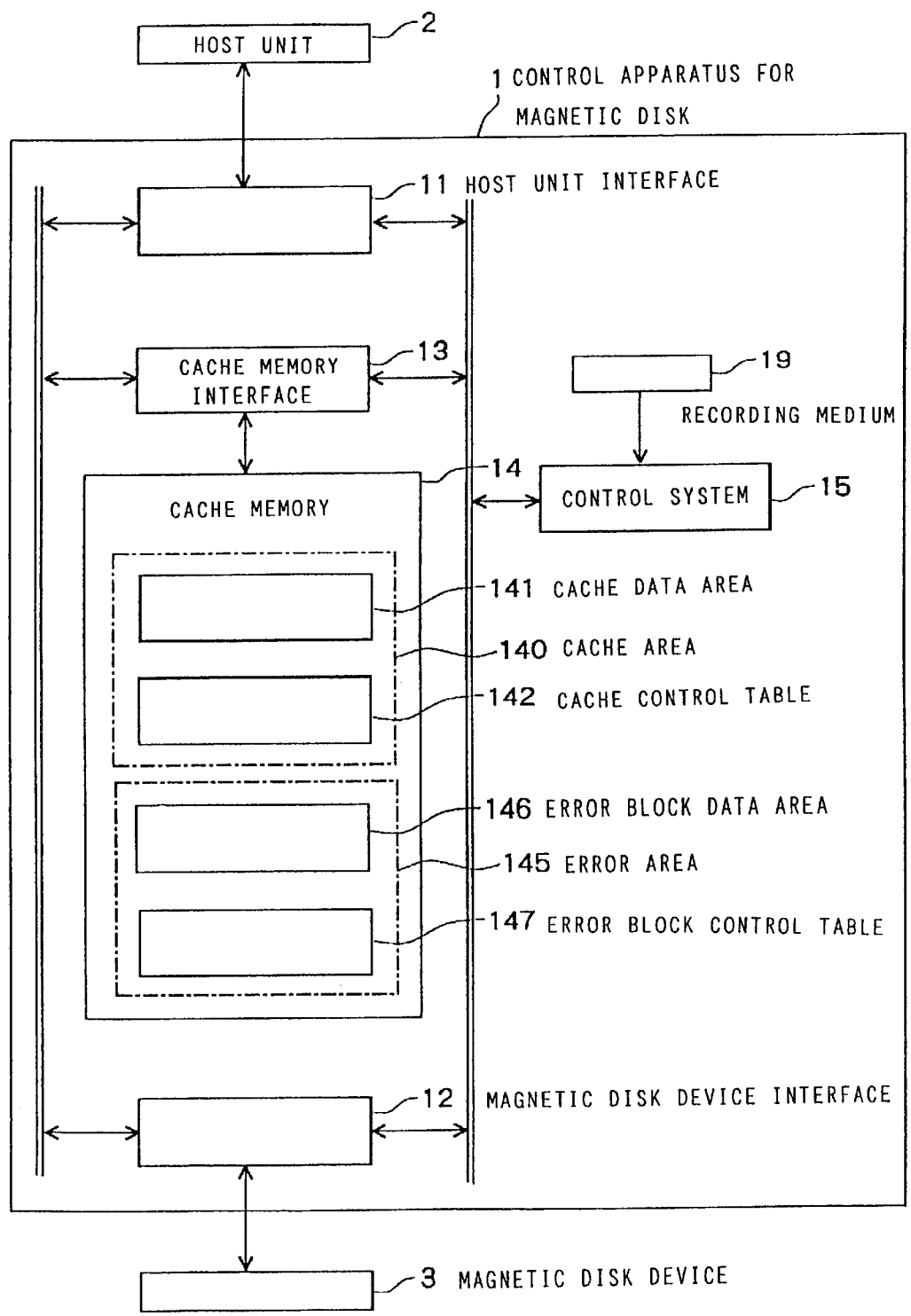
FIG. 1 is a block diagram showing a control apparatus of the magnetic disk device which is the first embodiment of the present invention.

Now, a mode of embodying the invention will be described with reference to the drawings. FIG. 1 is a block diagram showing a control for a magnetic disk device of a first embodiment of the present invention.

A control apparatus 1 of a magnetic disk device comprises a host unit interface 11, magnetic disk device interface 12, cache memory interface 13, cache memory 14, control system 15 and recording medium 19. The control apparatus 1 receives an instruction from a host unit 2 in response to an operation command issued by a program stored in the control system 15 for conducting a control to shorten the processing of writing and reading of data to and from a magnetic disk device 3.

The host unit interface 11 is adapted to operate interface signals based upon an interface specification defined between the interface 11 and the host unit 2 for transfer of read/write data and exchange of control information between the host unit interface 11 and the host unit 2. Similarly, the magnetic disk device interface 12 is adapted to operate interface signals based upon the interface signals based upon an interface specification defined between the interface 12 and the magnetic disk device 3 for transfer of read/write data and exchange of control information between the interface 12 and magnetic disk device 3. The cache memory interface 13 is adapted to operate control signals to activate the cache memory in accordance with an operation specification of the cache memory 14 for read/write of data from/to the cache memory 14.

The cache memory 14 comprises a cache area 140 and an error area 145 which is adapted to hold and control the data of retried block. The cache area 140 comprises a cache data area 141 and cache control table 142. The error area 145 comprises an error block data area 146 and error block control table 147.

The data of the magnetic disk device 3, which is treated as cache data, is stored in the cache data area 141. Information used for controlling the use condition of the cache data area is stored in the cache control table. The data of a block which could be read by retry is stored in the error block data area 146. Information used for controlling the registration condition of the error block is stored in the error block control table 147.

The control system 15 is a computer system mainly comprising a microprocessor and is adapted to control the control apparatus 1 for magnetic disk device by performing processing which is specified by a program in the computer system.

The recording medium 19 records thereon a control program for controlling read/write of data from/to the magnetic disk device 3 in the control system 15.

The control program is read from the recording medium to a data processing unit (not shown) of the control system 15 for controlling the operation of the data processing unit. The control system 15 executes the following processing under control of the control program.

The control system 15 executes the steps of:
(a) on receiving of an request of read from the host unit 2, determining with reference to the cache control table 142 whether or not the requested data is stored in the cache data area 141 and transferring the data to the host unit 2 if the requested data is stored in the cache data area 141;
(b) if no data is stored in the cache data area 141, calculating the range of data to be read and determining with reference to the error block control table 147 whether or not there is a registered block, followed by (i) reading from the magnetic disk device 3 data in a range up to the block concerned if there is registered data in the error block 145 or (ii) reading data in the entire calculated range if there is no registered data, to transfer the read data to the host unit 2 and to store it in the cache area 140;
(c) determining whether or not retry operation has been conducted on reading from the magnetic disk device 3, copying the data at a block address which has required the retry to the error block data area 146 if the retry has been conducted and registering its information in the error block control table 147;
(d) if data has been registered in the error block 145 after reading from the magnetic disk device 3, subsequently selecting and transferring corresponding data from the error block data area 146 to the host unit 2, and incorporating it into the block in interest of the cache data area 141 following the data which has been transferred by the previous reading operation; and
(e) repeating the steps of reading of data from the magnetic disk device 3 and reading of data from the error block data area 146 until reading of the data in the range to be read is completed.

Now, operation which is concerned with control to suppress the lowering of processing performance due to retry operation which the present invention contemplates will be described with reference to the flow charts shown in FIGS. 2 and 3.

Figure 2:
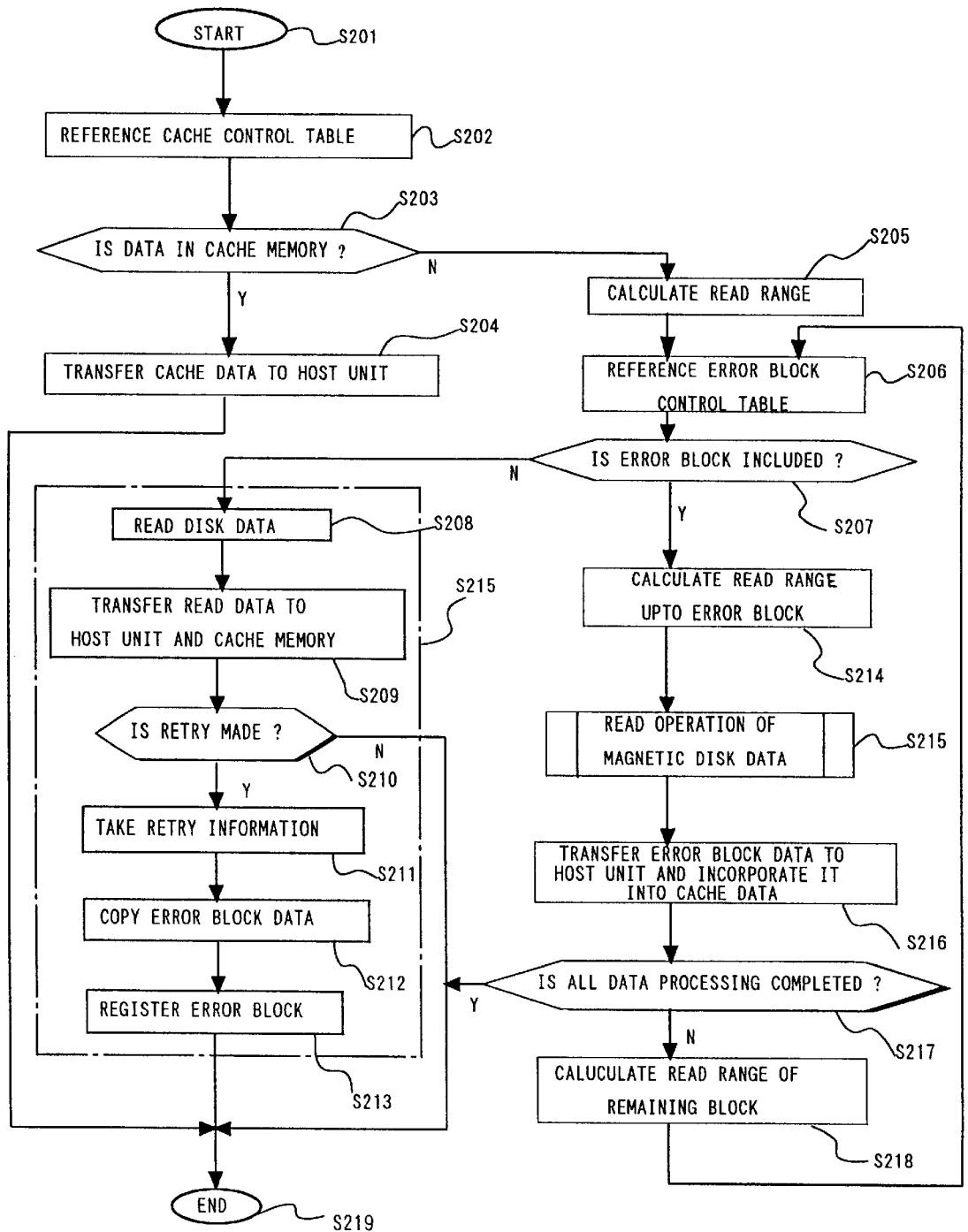
FIG. 2 is a flow chart showing the summary of the operation of a control apparatus when it receives a request of reading of data from host unit.

FIG. 2 is a flow chart showing the summary of the operation of the control apparatus 1 for the magnetic disk device which is performed on receipt of a request of reading of data from the host unit 2.

When a read request is received (S 201), the cache control table 142 is firstly referenced (S 202) simultaneously with usual cache control to determine whether or not request data is stored in the cache memory 141 (S 203). If the requested data is stored in the cache memory 141 (S 203 Y), the data of the cache memory 141 is transferred to the host unit 2 (S 204) to end the execution of the program (S 219).

If no data is stored in the cache memory 141, necessary data is read from the magnetic disk device 3. For that purpose, first the range of data to be read is calculated (S 205) so that reading is conducted in unit determined by the inherent cache control. Then, the error block control table 147 is referenced (S 206) to determine whether or not there is a block which has been registered as an error block in the error block in the range of data to be read from the magnetic disk device 3 (S 207).

If no error block has been registered (S 207 N), reading of the data in the range which was determined at step S 205 from the magnetic disk device [2] 3 is conducted (S 208) followed by transferring the read data to the host unit and simultaneously to store the data in the cache memory under the inherent cache control (S 209). Verification is made based upon an operation report from the magnetic disk device 3 representative of the condition of read operation whether or not retry operation has been conducted (S 210). If no retry was made (S 210 N), the execution of the program comes to end.

Widely used magnetic disk devices which comply SCSI specifications have a function to enable successful read by repeating the read operation many times by changing the read conditions in accordance with a retry program when a read error occurs which can not be recovered even by data correction. Reading may be often successful by this function. The magnetic disk devices also have a function to report at which block the retry operation was conducted when the data is read by this retry function.

However, it may take an extended period of time to successfully read the data.

Thus, if the retry operation has been conducted (S 210 Y), information on block address where the retry operation was conducted is obtained from the magnetic disk device 3 (S 211). The data at the block address requiring the retry operation which is stored in the cache data area 141 of the cache memory 14 is selected and is copied to the error block data area 146 (S 212). The information is registered in the error block control table 147 (S 213) and program comes to end (S 219).

If it is determined by the previous determination (S 207) that there is a block which has been registered in the error block control table 147 in the range to be read from the magnetic disk device 3, the range up to the block is calculated (S 214). Reading of the data which is restricted up to just before the registered block is conducted from the magnetic disk device 3 (S 215). At this time, the step for reading the magnetic disk data performs an operation which is equivalent to that of the above-mentioned steps S 208 through S 213.

If there is also a retry report at this step, the registration of the error block would be added. If the reading of the data up to the error block is completed, corresponding data is selected from the error block data area 146 in accordance with information which has been registered in the error block control table 147 and is transferred to the host unit 2 and is simultaneously incorporated into corresponding block of the cache data area 141 following the data which has been transferred by the previous reading operation (S 216). Subsequently, determination is made whether or not all the data which has been calculated at the previous step of calculation of the reading range (S 205) is processed. If the data of the previous error block is final data (S 217 Y), the program sequence is ended (S 219).

If the data further continues (S 217 N), the reading range is recalculated based upon the error block address, the operation of each is completed (S 218) and operation is carried out in accordance with the flow chart until the program sequence will be returned to the flow from the reference of the error block control table 147 at step (S 206) through the end.

FIG. 3 is a flow chart showing the summary of the operation of the control apparatus 1 for the magnetic disk device when it receives a request of data writing from the host unit 2.

When the request of writing is received (S 301), inherent write operation using the usual cache memory is conducted (S 302), and subsequently an operation related with the error block control is conducted.

The cache memory control conducted when the data is written to the magnetic disk device usually includes a case (operation) where data transferred from the host unit is stored in the cache memory and is processed, and a case (operation) where the transferred data is processed without storing in the cache memory. This is due to the fact that the unit of data which is handled by the cache control does not often necessarily match with the amount of data which is requested by the host unit. If the amount of transferred data is not larger than the unit of the cache control, shortfall data should be read from the magnetic disk device to make up a cache data. In such a case, only an operation to write data in the disk device is carried out. However, if the range of the block address in which the transferred data is accommodated is all stored in the cache memory, the data may be written to the magnetic disk device as well as the data in the corresponding cache memory may be replaced with the transferred data.

In the control shown in FIG. 3, the operation relating to the error block control is modified to match the cache memory control on inherent writing. After the inherent write operation (S 302), the error block control table 147 is referenced (S 303) to determine whether or not the block which is registered as an error block is included in the range in which the writing is requested (S 304). If not included (S 304 N), the program control is ended (S 309).

If it is included (S 304 Y), determination is made (S 305) whether or not write data remains in the cache memory after the inherent write operation at step S 302. If it does not remain (S 305 N), the registration of the information on the block address corresponding to the block included in the write range is canceled from the error block control table 147 (S 306).

If the write data remains in the cache memory (S 305 Y), corresponding data is selected from the data in the cache memory 141 and is copied to an area corresponding to the error block data area 146 which is registered in the error block control table 147 in the write range (S 307).

The operation of steps S 305 through S 308 is repeated until it is determined that operation of all error blocks included in the write range is ended (S 308 N).

If there is a data request for the address, the registration of which has been canceled, the data would be read from the magnetic disk device. It is expected that no retry is required since the conditions are improved by writing. The meritorious effect of the present invention are summarized as follows:

As mentioned above, in the control method of the present invention, an advantage is obtained that reading from the magnetic disk device which involves a retry operation can be minimized.

Therefore, the period of time which is taken to conduct retry operation can be shortened so that the operation performance of the magnetic disk device can be remarkably improved.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A method of controlling read/write of a magnetic disk device using a cache memory having an error area and a cache area, comprising the steps of:

reading data of a block from the magnetic disk device;

storing data of the block to be read in the error area when the reading step requires a retry, wherein the error area is provided separately from the cache area, and reading the data from said error area if said data stored in said error area is included in a read request from a host unit.

2. A method of controlling the magnetic disk device as defined in claim 1, further comprising the steps of:

receiving a read request from the host unit;

transferring the data from said cache area to the host unit if the requested data is stored in said cache area;

calculating the range of data to be read, if the requested data is not stored in the cache area;

reading the requested data from the magnetic disk device in the range up to the block stored in the error area if the block is registered in the error area, or reading the requested data from the magnetic disk device in the entire calculated range if no data is registered in the error area, and transferring the read data to the host unit and storing said read data in the cache area;

copying the data to the error area at a block address to which the reading step requires a retry if the retry has been conducted;

subsequently selecting and transferring corresponding data from the error area to the host unit, and storing the data in the cache area, if data has been registered in the error area after reading from the magnetic disk device; and repeating the steps of reading data from the magnetic disk device and reading data from the error area until the reading of data in the range to be read is completed.

3. A method of controlling a magnetic disk device as defined in claim 1, further comprising the steps of:

writing from the host unit to said magnetic disk device data transferred on receipt of a write request;

writing the transferred data to said magnetic disk device and replacing the data in the corresponding cache area with the transferred data, if the entire block address range in which the transferred data is accommodated is stored in the cache area;

canceling the registration of the block included in the range from said error area to the write area, if the block that has been registered in the error area is included in the write-requested range and write data does not remain in the cache area; and selecting corresponding data from the data in said cache area and copying the data to the corresponding area of said error area, if the block that has been registered in the error area is included in the write-requested range and write data remains in the cache area.

4. An apparatus for controlling read/write of a magnetic disk device, comprising:

a cache memory having a cache area for an inherent disk caching and an error area for holding and controlling data of a block to be read for which retry has been conducted, a host unit interface for transferring read/write data and for exchanging control information to and from a host unit, a magnetic disk device interface for transferring read/write data and for exchanging control information to and from said magnetic disk device, a cache memory interface for transferring read/write data and for exchanging control information to and from said cache memory, a control system for controlling operation of write/read of data to/from said magnetic disk device on reception of an instruction from said host unit in response to an operation command in accordance with a program, and a recording medium for recording a control program for controlling read/write of data from/to said magnetic disk device in said control system, wherein said error area stores the data of the block to be read when the reading of the data on the magnetic disk device requires a retry, wherein said error area is provided separately from said cache data area, and wherein the data from said error area is read if the data requested from the host unit is found in said error area.

5. An apparatus for controlling the magnetic disk device as defined in claim 4, wherein:

the cache area includes a cache control table for storing information used for controlling use condition of the cache memory, the data of the block readable by retry is stored in the error area, and the error area includes an error block control table for storing information used for controlling the registration condition of the error block.

6. A computer readable program product for executing on reception of a read request from a host unit, said program comprising instructions for:

determining with reference to a cache control table whether or not requested data is stored in a cache data area and transferring the data from said cache data area to the host unit if the requested data is stored in the cache data area;

if no requested data is stored in the cache data area, calculating the range of data to be read, and determining with reference to an error block control table whether or not a registered block is stored in an error block data area, which is separate from said cache data area, and reading from a magnetic disk device the requested data in the range up to the registered block if the registered block is registered in the error block data area, or reading the requested data in the entire calculated range from said magnetic disk device if no registered data is registered in said error block data area, and transferring the read data to the host unit and storing said read data in the cache data area;

determining whether or not retry operation has been conducted on reading from the magnetic disk device, copying the data at a block address for which retry has been required to the error block data area and registering data information in the error block control table;

if data has been registered in the error block data area after reading from the magnetic disk device, subsequently selecting and transferring corresponding data from the error block data area to the host unit, and storing the data in the cache data area following the data that has been transferred by a previous reading operation; and repeating reading data from the magnetic disk device and reading data from the error block data area until reading of data in the range to be read is completed.

7. An apparatus for controlling read/write of a magnetic disk device, comprising:

a cache memory having a cache area for an inherent disk caching and an error area for holding and controlling data of a block for which retry has been conducted, wherein the error area is provided separately from the cache area, a host unit interface for transferring read/write data and for exchanging control information to and from a host unit, a magnetic disk device interface for transferring read/write data and for exchanging control information to and from said magnetic disk device, a cache memory interface for transferring read/write data and for exchanging control information to and from said cache memory, a control system for controlling operation of write/read of data to/from said magnetic disk device on reception of an instruction from said host unit in response to an operation command in accordance with a program, and a recording medium for recording a control program for controlling read/write of data from/to said magnetic disk device in said control system, wherein the cache area includes a control table for storing information used for controlling use condition of the cache memory, wherein the error area stores the data of the block readable by retry, and wherein the error area includes an error block control table for storing information used for controlling the registration condition of the error block.

* * * * *